United States Patent
DaSilveira

(10) Patent No.: US 6,698,964 B2
(45) Date of Patent: *Mar. 2, 2004

(54) VARIABLY CONFIGURABLE CATTLE STALL CONNECTION

(75) Inventor: John D. DaSilveira, Lovington, NM (US)

(73) Assignee: John DaSilveira, Madisonville, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,769

(22) Filed: Feb. 5, 1999

(65) Prior Publication Data

US 2001/0051070 A1 Dec. 13, 2001

(51) Int. Cl.[7] .................................................. A01K 1/00
(52) U.S. Cl. ........................ 403/218; 403/217; 403/400; 403/237; 403/232.1; 403/344; 119/516
(58) Field of Search ................................ 403/218, 217, 403/235, 236, 237, 232.1, 344, 373, 374.3, 400; 119/523, 522, 520, 516, 14.03

(56) References Cited

U.S. PATENT DOCUMENTS

| | | | | |
|---|---|---|---|---|
| 1,054,803 A | * | 3/1913 | Stiver | 403/395 |
| 1,373,458 A | * | 4/1921 | Stevenson | |
| 2,611,160 A | * | 9/1952 | Hanesse | 403/237 |
| 2,642,037 A | * | 6/1953 | Merrill | |
| 3,420,019 A | * | 1/1969 | Padilla | 52/238.1 |
| 3,421,478 A | * | 1/1969 | Warmerdam | |
| 5,111,770 A | * | 5/1992 | Weelink | |
| 5,349,800 A | * | 9/1994 | Peng | 403/403 |
| 5,975,026 A | * | 11/1999 | Rudolph | 119/523 |
| 6,026,766 A | * | 2/2000 | Albers, Jr. | 119/520 |

FOREIGN PATENT DOCUMENTS

| | | | |
|---|---|---|---|
| FR | 632606 A1 | * | 10/1927 |
| FR | 1333202 A1 | * | 6/1963 |

* cited by examiner

Primary Examiner—Lynne H. Browne
Assistant Examiner—Ernesto Garcia
(74) Attorney, Agent, or Firm—William P. Glenn, Jr.; Royston Rayzor Vickery & Williams, LLP

(57) ABSTRACT

A connection assembly for constructing animal stalls including a connection body that is rigidly constructed and adapted for releasable and variable positioning upon an elongate support rail. A first releasable connector is formed in the connection body and is adapted for releasable fixation to an animal stall divider. The connection body is elongately constructed along a longitudinal axis with first and second ends that are distally located one from the other. The first releasable connector is positioned at the first end of the connection body. The connection body has first and second side flanges that are connected together by a webbing. At least a portion of the first and second side flanges project away from the webbing to form a receiving area between the portions of the first and second side flanges that is configured to insertibly accept a portion of an animal stall divider to be secured therein. A first releasable lock mechanism is provided that is adapted to releasably secure an animal stall divider in the receiving area. The first releasable lock mechanism is located at the first releasable connector and a similarly configured second releasable lock mechanism is located at the second releasable connector.

14 Claims, 3 Drawing Sheets

VARIABLY CONFIGURABLE CATTLE STALL CONNECTION

DESCRIPTION

1. Technical Field

The present invention relates generally to livestock equipment, and more specifically to devices utilized to construct stalls for livestock such as dairy cattle and the like.

2. Background Art

It is a frequently utilized practice in the livestock industries to provide separate stalls for individual animals which establish proper and safe spacing between those animals using the stalls. Typically, divider walls or other types of projections will be extended from a longitudinally running support frame or rail. The divider walls are fixed to the support frame so that appropriate spacing is established between adjacent divider walls and suitably sized stalls are created. In conventional designs, such divider walls are fixedly attached to the support frame and are not made adjustable and therefore the size of individual stalls can not be altered to accommodate differently sized animals. This can be problematic when a user such as a dairyman changes between one type of milk producing cow to another. As an example, a dairyman may switch from smaller Jersey breed milk cows to Holstein breed milk cows which are substantially larger in stature than the Jerseys. If the stalls had been initially configured to accommodate as many Jersey cows as possible, the spacing will be too small for the larger Holstein cows being moved into the same holding area. In the event that the divider wall's are fixedly attached to the support frame, reconstructive efforts will have to be undertaken in order to change the spacing. This is an expensive and time consuming reconfiguration for the owner.

The fixed connection of the divider wall or divider rail to the support frame is typically accomplished using a welded connection unit. An obvious drawback of such a fixed connection is that easy reconfiguration and adjustability is prevented. An equally important drawback of the fixed connection is that little or no flexibility is permitted in the connection unit itself and resultingly, breakage is not uncommon. The animals contained within the stalls can be of considerable size and exert substantial forces on the divider rails. This can occur simply as a result of the animal's turning about within the stall to head out instead of backing out of the stall. If the connection between the divider rail and support frame is broken as a result of such a turn, repairs are required before either of the stalls on adjacent sides of that damaged divider can be properly utilized.

The installation of conventionally designed welded connections for the divider rails or walls to the support frame require a person skilled in welding to go onsite, together with their welding equipment, for both the erection and repair of such animals stalls. Still further, conventionally designed connectors are constructed from multiple parts that are themselves welded together. This manner of construction causes the conventionally designed connector to be expensive.

In view of the above described deficiencies associated with the design and use of conventional connections between stall dividers and their support frames, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed connection assemblies for animal stall dividers and incorporates several additional beneficial features.

The present design not only lowers the manufacturing cost of the disclosed connection unit used to couple divider rails to the elongated support frame upon which such dividers are suspended, but the design also facilitates easy and inexpensive erection and reconfiguration of the stalls that are established by such divider rails. Not only are there no welded joints within the body of the connection assembly itself, but the design of the assembly also eliminates the necessity for welded connections between the connection assembly and the divider rails and the elongate support frame. As intimated above, the elimination of welded joints reduces the cost of manufacture and the cost of installation and reconfiguration by eliminating the need for a skilled welding person and his equipment both at the manufacturing facility and onsite where the animal stalls are erected.

The bent or molded nature of the connection body of the present invention also provides significant economies over previously welded designs for similar connection bodies. Where a skilled tradesman such as a welder was previously required for the assembly of such earlier connection assemblies, the connection bodies of the present invention are easily bent or molded without requiring the attention of such a skilled person. This of course reduces the cost of manufacture of the connection assembly and hastens its production.

The releasable nature of the coupling of the connection assembly to the support frame facilitates adjustability and versatility in the connection assembly's positioning upon the support rail and thereby enables easy establishment of differently sized stalls. As described above, this proves to be a significant benefit to the owner of such connection assemblies upon initial installation of such animals stalls, and upon required reconfigurations when the nature or size of the animals to be contained in such stalls changes. As before, an apt example is a dairyman who changes from a smaller breed of milk cow to a larger breed and therefore that owner must expand the width between the divider rails.

The releasable nature of the invention's coupling of the connection assembly to the divider rail also provides benefits to the owner of the connection assembly. Not only does it accommodate variable positioning of the divider rail with respect to the connection assembly, but because of the use of a friction connection, as opposed to a rigid welded connection, the connection assembly is made substantially more durable and much less susceptible to damage. Where the welded connections in the connection assembly previously fractured under such normal stresses as when an animal brushed up against a divider rail when turning about within the stall, the present design which utilizes releasable friction connections facilitates a certain amount of "give" in the connection assembly so that fractures and damage do not result under normal use conditions.

In one embodiment, the present invention takes the form of a connection assembly for constructing animal stalls. The connection assembly includes a connection body that is rigidly constructed and which is adapted for releasable and variable positioning upon an elongate support rail for animal stall dividers. A first releasable connector is formed in the connection body and is adapted for releasable fixation to an animal stall divider. In the illustrated embodiment, a second releasable connector is also formed in the connection body which is adapted for releasable fixation to another animal stall divider.

The connection body is elongately constructed along a longitudinal axis with first and second ends that are distally located one from the other. The first releasable connector is positioned at the first end of the connection body and the second releasable connector is positioned at the second end of the connection body. The second releasable connector is oriented oppositely to the first releasable connector for positioning the second animal stall divider outwardly and away from the connection body in an opposite direction to the direction in which the first animal stall divider is positioned from the first releasable connector.

The connection body has first and second side flanges that are connected together by a webbing. At least a portion of the first and second side flanges project away from the webbing to form a receiving area between the portions of the first and second side flanges that is configured to insertibly accept a portion of an animal stall divider to be secured therein.

A first releasable lock mechanism is provided that is adapted to releasably secure an animal stall divider in the receiving area. The first releasable lock mechanism is located at the first releasable connector and a similarly configured second releasable lock mechanism is located at the second releasable connector. In the illustrated embodiment, the first releasable lock mechanism includes at least one threaded bolt and nut assembly that is disposed, or disposable, across the first and second side flanges for adjusting a spacing distance between those side flanges.

In a preferred embodiment, at least one of the first and second side flanges is adapted for flexion toward the other of the side flanges under operation of the releasable lock mechanism. In this way the lock mechanism is able to reduce a spacing distance between the side flanges for frictionally fixing an animal stall divider in the receiving area. Optionally, both of the side flanges may be adapted for flexion, one toward the other, under operation of the releasable lock mechanism. In one embodiment, at least one threaded bolt and nut assembly is disposed between the first and second side flanges for adjusting the spacing distance therebetween. As illustrated, two threaded bolt and nut assemblies are disposed across the first and second side flanges at each end of the connection body for adjusting the spacing distance between the side flanges.

At least one of the side flanges is flared inward toward a longitudinal axis of the connection body at an end region of the connection body from a center distance from the longitudinal axis at a central region of the connection body. In other words, the width of the connection body narrows from a wider central region to narrower end regions. The side flanges each have a recessed lip at the central region of the connection body for accommodating reception of an elongate support rail upon which the animal stall dividers are to be suspended. As illustrated, the recessed lip is formed on a substantially circular radius.

At least one U-bolt is connected to the webbing at the central region of the connection body for affecting releasable connection to the elongate support rail. Preferably there are two U-bolts cooperatively utilized for this purpose. Each U-bolt is adapted to accommodate sliding engagement of the connection body upon an elongate support rail thereby enabling adjustment not only of the location of the connection assembly upon the support rail, but in turn, spacing between animal stall dividers which establishes the width of created animal stalls between the dividers. In the illustrated embodiment, a body portion of the U-bolt is disposed in an interior region of the connection body with a threaded portion of the U-bolt extending through the connection body. A nut is screwably engaged upon the threaded portion of the U-bolt at an exterior region of the connection body for variably adjusting the U-bolt's position with respect to the connection body.

The beneficial effects described above apply generally to the exemplary devices and mechanisms disclosed herein for establishing a connection between an animal stall divider rail and the elongate support upon which the divider is suspended. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 5:
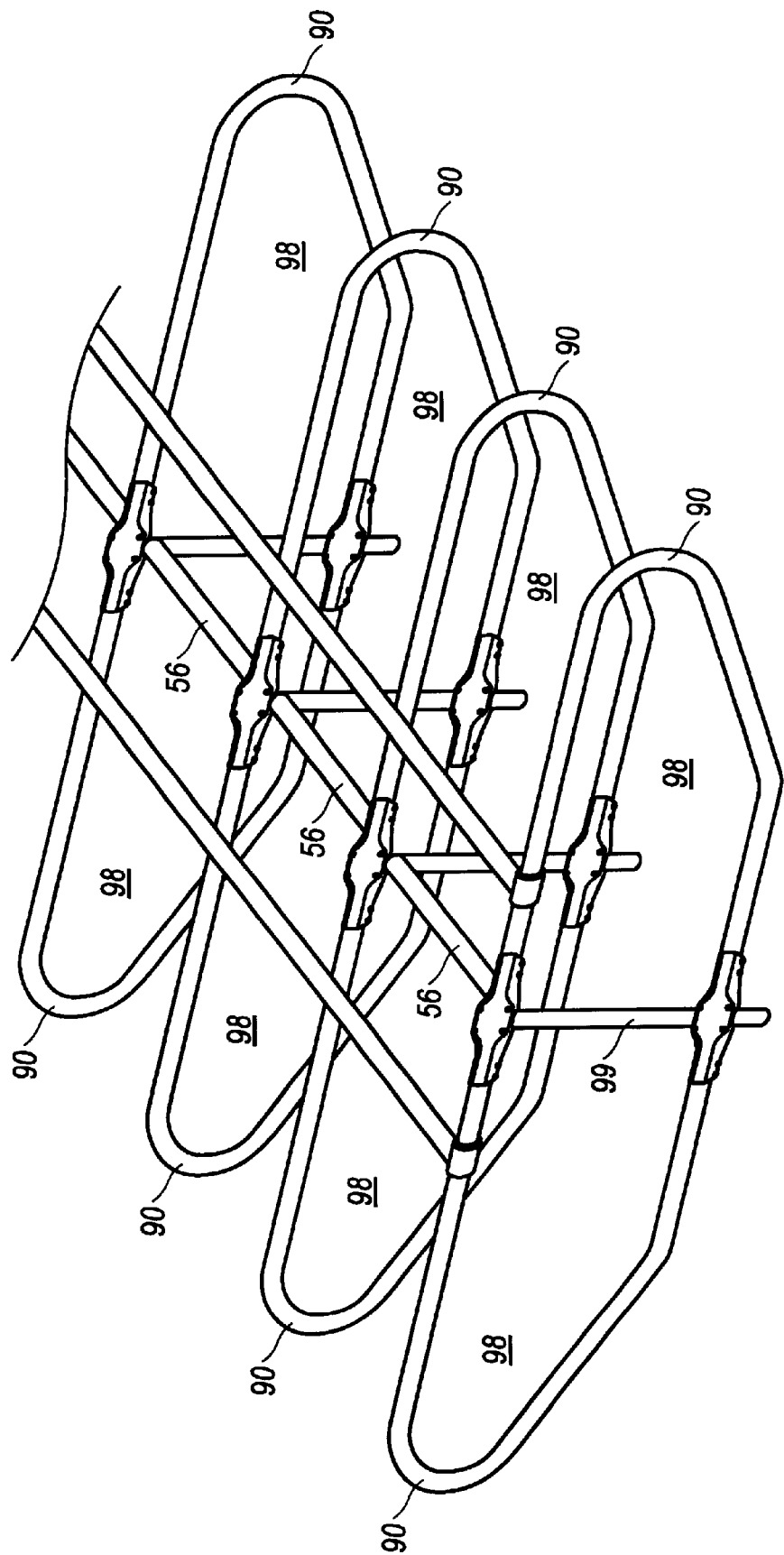
FIG. 5 is a perspective view of a series of animal stalls established through the utilization of the connection assemblies of the present invention.

Referring to the figures, a series of animal stalls 98 may be appreciated in FIG. 5 which are utilized to establish proper animal spacing for feeding and/of holding purposes. One or more elongate support rails 56 are held upon upright stands 99. A plurality of the divider rails 90 are suspended upon the support rails 56 and extend outwardly therefrom to create individual stalls 98 therebetween. Each divider rail 90 is mounted to one or more of the support rails 56 by connection assemblies 10.

Each connection assembly 10 includes a connection body 12 having two end regions 62 opposite one another across a central region 64 of the connection body 12. A first end 28 of the connection body 12 which corresponds to one of the end regions 62 of the connection assembly 10 includes a first releasable connector 14 configured for releasable connection to an insertible portion 94 of a connection end 92 of a divider rail 90. Similarly, a second end 44 of the connection body 12 which corresponds to the other of the end regions 62 of the connection assembly 10 includes a second releasable connector 30 that is also configured for releasable connection to an insertible portion 94 of an oppositely oriented divider rail 90. In the illustrated embodiment, first and second side flanges 46, 50 are joined together by a web 54 to form the connection body 12 and establish a receiving area 60 therewithin defined as a spacing distance between the flanges 46, 50. The construction of the side flanges 46, 50 and the web 54 is such that the flanges 46, 50 are permitted to flex at least inwardly, one toward the other under the influence of a biasing force.

First and second releasable lock mechanisms 16 and 22 are provided in the first releasable connector 14. Each releasable lock mechanism 16, 22 comprises a threaded bolt 18, 24 and a screwably connectible nut 20, 26 selected for threaded engagement upon the bolt 18. A similar lock configuration is provided at the second releasable connector 30 and includes first and second releasable lock mechanisms 32, 30 with threaded bolts 34,40 and nuts 36,42. By tightening the lock mechanisms 16,22 and drawing the side flanges 46, 50 inward toward one another thereby constricting the receiving area 60 while an insertible portion 94 of the divider rail 90 is positioned therein, the divider rail 90 is frictionally and releasably pinch-secured to the connection body 12.

Figure 1:
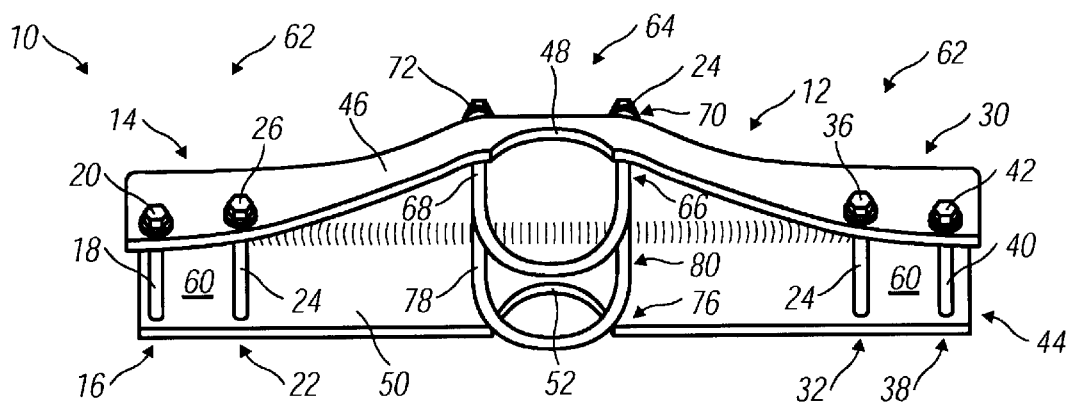
FIG. 1 is a open-side perspective view of a connection assembly configured according to the present invention.
Figure 2:
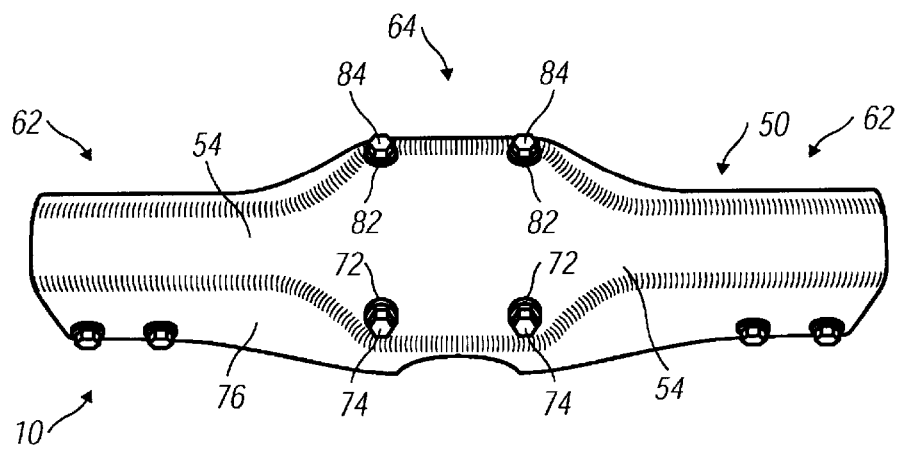
FIG. 2 is a web-side perspective view of a connection assembly configured according to the present invention.
Figure 3:
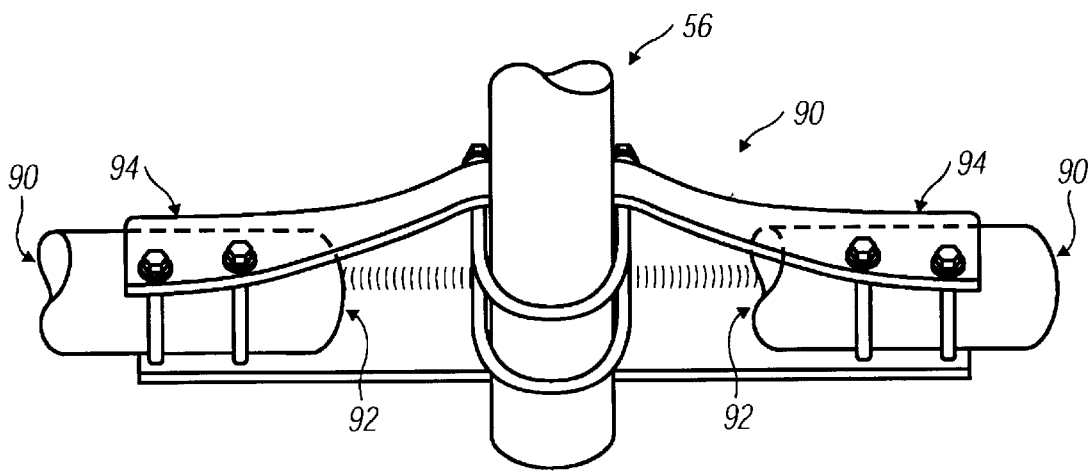
FIG. 3 is a perspective view of the connection assembly of FIGS. 1 and 2 with abbreviated divider rails and an elongate support member shown in cooperation therewith.
Figure 4:
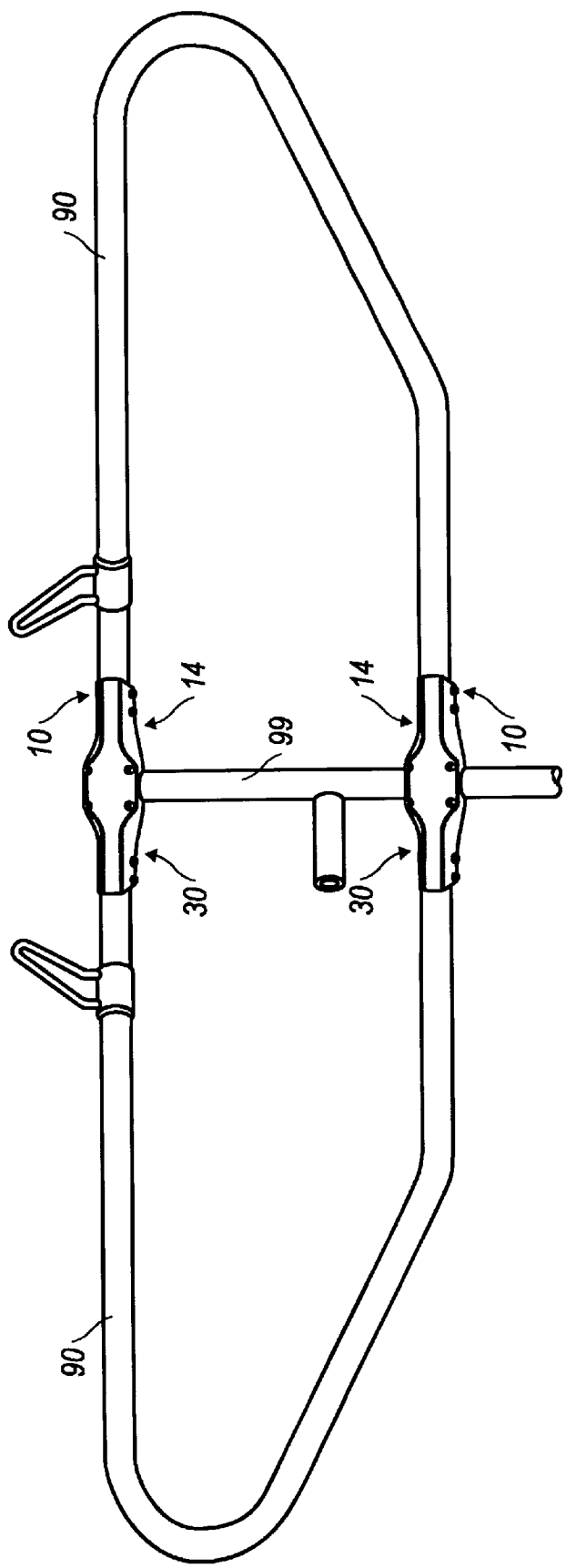
FIG. 4 is a side elevational view of two connection assemblies' utilization in supporting two divider rails upon a support frame.

As may be best appreciated in FIG. 4, two connection assemblies 10 are provided to support a first divider rail 90 on one side of the elongate support rails 56 and a second divider rail 90 opposite thereto on the opposite side of the elongate support rails 56. Regarding the upper connection assembly 10, the receiving area 60 opens downwardly with the web 54 positioned at the top of that connection assembly 10. The lower connection assembly 10 is oppositely oriented with its receiving area 60 opening upwardly. Each of the releasable connectors 14, 30 are complementarily shaped for receiving the insertible portion 94 of the connection end 92 of the divider rail 90. In the illustrated case, the complementary shaped is a round tubular.

Each connection body 12 is suspended from an elongate support rail 56. As described above, it is desirable that the connection be releasable and variably configurable so that the animal stalls' 98 widths can be easily adjusted. The present invention accomplishes such a releasable connection to the elongate support rail 56 utilizing at least a first U-bolt 66, and preferably also a second U-bolt 76. Each U-bolt 66, 76 is configured so that a body portion 68, 78 is U-shaped with a curved bite portion and two threaded portion's 70, 80 extending therefrom. In an assembled configuration, each of the U-bolts 66, 76 are positioned at the central region 64 of the connection body 12. The U-bolts 66, 76 are connected to the connection body 12 by extending distal ends of the threaded portions 80 through apertures in the web 54 at the central region 64 of the body 12. Securement of the U-bolt 66, 76 is then accomplished by positioning a washer 72, 82 over the protruding threaded end portion 70, 80 and tightening a nut 74, 84 thereupon. Through the tightening process, the nut 74, 84 and washer 72, 82 are snugged up against an exterior surface of the connection body 12 thereby causing the U-shaped bite portion of the U-bolt 66, 76 to be drawn toward an interior surface of the connection body 12. When an elongate support rail 56 is positioned between the U-bolt 66, 76 and the connection body 12, a releasable and adjustable connection is accomplished therebetween.

To assure proper seating of the connection body 12 upon the elongate support rail 56, recessed lips 48, 52 are provided at edge portions of each of the side flanges 46, 50. The recesses 48, 52 are configured to complementarily mate with an exterior surface of the support rail 56. In the illustrated embodiment, each recess 48, 52 is formed on a radius substantially conforming to be outer diameter of the round tubular pipe that forms the support rail 56.

In practice, the position of the divider rails 90 can easily be adjusted by loosening the U-bolts' 66, 76 connection, sliding the connection body 12 along the rail 90, and then re-tightening the U-bolts 66, 76.

Because the connections between the connection body 12, the divider rails 90 and the elongate support rails 56 are not fixed, not only is adjustability facilitated, but an acceptable amount of "give" is designed into the connection assembly 10 thereby avoiding damage when stresses are imposed thereupon by such actions as a cow turning about while still in a stall between two divider rails 90.

An assembly for establishing a connection between an animal stall divider rail 90 and the elongate support 56 upon which the divider 90 is suspended and its components has been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the livestock industries.

What is claimed and desired to be secured by Letters Patent is as follows:

1. A connection assembly for constructing animal stalls, said connection assembly comprising:
   a connection body rigidly constructed with an interior surface, said connection body releasably and variably fixed, at said interior surface, upon an elongate support rail for animal stall dividers by a releasable friction connector that causes said elongate support rail to be drawn towards said interior surface thereby causing frictional fixation between said connection body and said elongate support rail;
   a first and second releasable connectors formed in said connection body, each of said releasable connectors are releasably fixed and secured to an animal stall divider by a releasable lock mechanism;
   each of said releasable connectors further comprising first and second side flanges, and a webbing, said first and second side flanges connected together by said webbing, and a portion of said first side flange and a portion of said second side flange projecting away from said webbing thereby forming a receiving area in said connection body between said portions of said first and second side flanges for a portion of the animal stall divider; and
   at least one of said first and second side flanges flexing toward the other of said side flanges under operation of said at least one releasable lock mechanism thereby reducing a spacing distance between said side flanges for frictionally fixing an animal stall divider in said receiving area.

2. The invention as recited in claim 1, wherein said at least one releasable lock mechanism comprises:
   at least one threaded bolt and nut assembly disposed across said first and second side flanges for adjusting the spacing distance between said side flanges.

3. A connection assembly for constructing animal stalls, said connection assembly comprising:
   a unitary connection body releasably and variably fixed upon an elongate support rail for animal stall dividers by a releasable friction connector; and
   a first releasable connector and a recessed lip formed in said connection body, said first releasable connector releasably fixed to an animal stall divider independent of said releasable and variable fixation of said connection body upon said elongate support rail, and said connection body releasably, and variably fixed upon said elongate support rail at said recessed lip by said releasable friction connector independent from said releasable fixation of said animal stall divider to said connection body.

4. The invention as recited in claim 3, further comprising:
a second releasable connector formed in said connection body, said second releasable connector releasably fixed to an animal stall divider independent of said releasable and variable fixation of said connection body upon said elongate support rail.

5. The invention as recited in claim 4, further comprising:
said connection body being elongately constructed along a longitudinal axis and said connection body having said first and second releasable connectors formed in distal and opposite regions of said connection body to orient animal stall dividers releasably fixated to said connection assembly in opposing directions and independent of said releasable and variable fixation of said connection body upon said elongate support rail and said releasable and variable fixation of said connection body upon said elongate support rail is independent from said releasable fixation of said animal stall divider to said connection body.

6. The invention as recited in claim 4, wherein said connection body comprises:
first and second side flanges and a webbing, said first and second side flanges connected together by said webbing, and a portion of said first side flange and a portion of said second side flange projecting away from said webbing thereby forming a receiving area between said portions of said first and second side flanges for a portion of an animal stall divider; and
at least one of said first and second side flanges flexing toward the other of said side flanges under operation of a releasable lock mechanism removably fixed to said first and second side flanges thereby reducing a spacing distance between said side flanges to frictionally fix an animal stall divider in said receiving area.

7. A connection assembly for constructing animal stalls, said connection assembly comprising:
a rigidly constructed connection body releasably and variably fixed upon an elongate support rail for animal stall dividers by a releasable friction connector;
a first and second releasable connectors formed in said connection body, each of said releasable connectors releasably fixed and secured to an animal stall divider by a releasable lock mechanism;
first and second side flanges, said first and second side flanges connected together by a webbing, and a portion of said first side flange and a portion of said second side flange projecting away from said webbing thereby forming a receiving area between said portions of said first and second side flanges for a portion of an animal stall divider; and
at least one of said first and second side flanges being flared inward toward a longitudinal axis of said connection body at an end region of said connection body from a center distance from said longitudinal axis at a central region of said connection body.

8. A connection assembly for constructing animal stalls, said connection assembly comprising:
a unitary connection body rigidly constructed and releasably and variably positioned upon an elongate support rail for animal stall dividers by a releasable friction connector;
a first releasable connector formed in said connection body, said first releasable connector releasably fixing an animal stall divider to said connection body independent of said releasable and variable positioning of said connection body upon said elongate support rail, and said releasable and variable positioning of said connection body upon said elongate support rail is independent from said releasable fixation of said animal stall divider to said connection body;
a second releasable connector formed in said connection body, said second releasable connector releasably fixing an animal stall divider to said connection body independent of said releasable and variable positioning of said connection body upon said elongate support rail and said releasable and variable positioning of said connection body upon said elongate support rail is independent from said releasable fixation of said animal stall divider to said connection body;
said connection body comprising first and second side flanges and a webbing, said first and second side flanges connected together by said webbing, a portion of said first side flange and a portion of said second side flange projecting away from said webbing to form a receiving area between said portions of said first and second flanges for a portion of an animal stall divider;
at least one of said side flanges flexing toward the other of said side flanges under operation of a releasable lock mechanism disposed between said side flanges; and
at least one of said first and second side flanges having a recessed lip at a central region of said connection body for accommodating reception of an elongate support rail for animal stall dividers.

9. The invention as recited in claim 8, wherein said recessed lip is formed on a substantially circular radius.

10. The invention as recited in claim 8, said releasable friction connector comprising:
at least one U-bolt connected to said webbing at said central region of said connection body for affecting releasable connection of said connection body to the elongate support rail for animal stall dividers independent of said releasable fixation of said animal stall divider to said connection body.

11. The invention as recited in claim 8, said releasable friction connector comprising, at least two U-bolts connected to said webbing at said central region of said connection body for cooperatively affecting releasable connection of said connection body to the elongate support rail for animal stall dividers independent of said releasable fixation of said animal stall divider to said connection body.

12. The invention as recited in claim 10, wherein said at least one U-bolt is adapted to accommodate sliding engagement of said connection body upon an elongate support rail for animal stall dividers independent of said releasable fixation of said animal stall divider to said connection body.

13. The invention as recited in claim 12, wherein said at least one U-bolt is connected to said webbing at said central region of said connection body for cooperatively affecting releasable connection of said connection body to an elongate support rail for animal stall dividers independent of said releasable fixation of said animal stall divider to said connection body.

14. The invention as recited in claim 10, further comprising:
a body portion of said U-bolt being disposed in an interior region of said connection body with a threaded portion of said U-bolt extending through said connection body; and
a nut screwably engaged upon said threaded portion of said U-bolt at an exterior region of said connection body for variably adjusting said U-bolt's position with respect to said connection body.

* * * * *